United States Patent [19]
Lerner et al.

[11] Patent Number: 5,887,412
[45] Date of Patent: Mar. 30, 1999

[54] PACKAGING MACHINE, MATERIAL AND METHOD

[75] Inventors: Hershey Lerner, Aurora; Dana J. Liebhart, Cuyahoga Falls, both of Ohio

[73] Assignee: Automated Packaging Systems, Inc., Streetsboro, Ohio

[21] Appl. No.: 972,880

[22] Filed: Nov. 18, 1997

Related U.S. Application Data

[62] Division of Ser. No. 699,126, Aug. 16, 1996, Pat. No. 5,743,070.

[51] Int. Cl.$^6$ ........................................................ B65B 7/06
[52] U.S. Cl. ............................ 53/481; 53/373.6; 53/479
[58] Field of Search ........................... 53/481, 373.6, 53/373.9, 387.2, 387.3, 48.9, 479

[56] References Cited

U.S. PATENT DOCUMENTS

| | | | |
|---|---|---|---|
| 2,114,624 | 4/1938 | Bergstein | 53/373.6 |
| 2,299,699 | 10/1942 | Hultkrans | 53/373.6 X |
| 2,358,125 | 9/1944 | Anderson | 53/481 X |
| 2,412,862 | 12/1946 | Bergstein | 53/481 |
| 2,667,997 | 2/1954 | Vogt | 53/570 X |
| 2,671,587 | 3/1954 | Vogt | 53/284.7 X |
| 2,845,166 | 7/1958 | Schaeffer | 198/819 |
| 2,979,995 | 4/1961 | Bergstein | 53/373.6 X |
| 3,019,855 | 2/1962 | Engle | 226/173 X |
| 3,120,892 | 2/1964 | Henning et al. | 198/819 X |
| 3,190,049 | 6/1965 | Van Der Meulen | 53/570 X |
| 3,197,936 | 8/1965 | Messmer | 53/570 X |
| 3,241,290 | 3/1966 | Ingleson et al. | 53/373.6 |
| 3,323,703 | 6/1967 | Wibbing et al. | 226/173 |
| 3,359,703 | 12/1967 | Quaadgras . | |
| 3,427,684 | 2/1969 | Tsien | 226/173 X |
| 3,488,244 | 1/1970 | Lepisto | 53/373.9 X |
| 3,492,783 | 2/1970 | Dohmeier | 53/570 X |
| 3,540,183 | 11/1970 | Bodolay et al. | 53/455 X |
| 3,559,372 | 2/1971 | Cerioni | 53/373.6 X |
| 3,559,874 | 2/1971 | Titchenal . | |
| 3,567,095 | 3/1971 | Geist et al. | 226/172 |
| 3,583,127 | 6/1971 | Marchand . | |
| 3,610,501 | 10/1971 | Wolfelsperger | 226/172 |
| 3,673,765 | 7/1972 | Dohmeier et al. | 53/570 |
| 3,744,211 | 7/1973 | Titchenal et al. . | |
| 3,746,056 | 7/1973 | Titchenal et al. . | |
| 3,773,235 | 11/1973 | Canamero et al. | 226/173 X |
| 3,779,449 | 12/1973 | Membrino . | |
| 3,791,573 | 2/1974 | Titchenal et al. . | |
| 3,817,017 | 6/1974 | Titchenal . | |
| 3,969,746 | 7/1976 | Titchenal et al. . | |
| 4,063,983 | 12/1977 | Shiverdecker | 53/373.6 X |
| 4,169,345 | 10/1979 | Douwenga | 53/570 |
| 4,201,031 | 5/1980 | Wiles . | |
| 4,505,382 | 3/1985 | Mareau | 198/819 |

(List continued on next page.)

OTHER PUBLICATIONS

"Joker System Joker Combi Lin Packaging System", Joker System AB (Undated Brochure).

*Primary Examiner*—John Sipos
*Attorney, Agent, or Firm*—Watts, Hoffman, Fisher & Heinke Co., L.P.A.

[57] ABSTRACT

A packaging machine and process for loading bags of a novel web of side connected bags are disclosed. The web is fed through a bagger section by a pair of grooved main transport belts and a pair of lip transport belts each disposed in the groove of the associated main belt to trap bag lips in the grooves. Adjustable belt spreaders space reaches of the transport belts as they move through a load station whereby to sequentially open the bags into rectangular configurations. A closure section in the form of a novel and improved heat sealer is releasably connectable to the bagger section. The sections are adjustable together between horizontal and vertical orientations. Processes of opening, closing and sealing side connected bags are also disclosed.

20 Claims, 15 Drawing Sheets

U.S. PATENT DOCUMENTS

| | | | |
|---|---|---|---|
| 4,514,962 | 5/1985 | Ausnit | 53/384.1 X |
| 4,558,556 | 12/1985 | Jostler . | |
| 4,586,319 | 5/1986 | Ausnit . | |
| 4,617,785 | 10/1986 | Chikatani et al. | 53/570 X |
| 4,654,878 | 3/1987 | Lems . | |
| 4,665,552 | 5/1987 | Lems et al. | 53/469 X |
| 4,850,178 | 7/1989 | Ausnit | 53/384.1 X |
| 4,945,714 | 8/1990 | Bodolay et al. . | |
| 4,969,310 | 11/1990 | Lerner et al. . | |
| 5,187,917 | 2/1993 | Mykleby . | |
| 5,197,318 | 3/1993 | Joyce et al. | 226/172 X |
| 5,609,008 | 3/1997 | Reuteler | 53/48.7 |
| 5,642,599 | 7/1997 | Tisma | 53/373.6 |
| 5,664,401 | 9/1997 | Portrait et al. | 53/387.2 X |
| 5,669,203 | 9/1997 | Muller | 53/48.7 X |

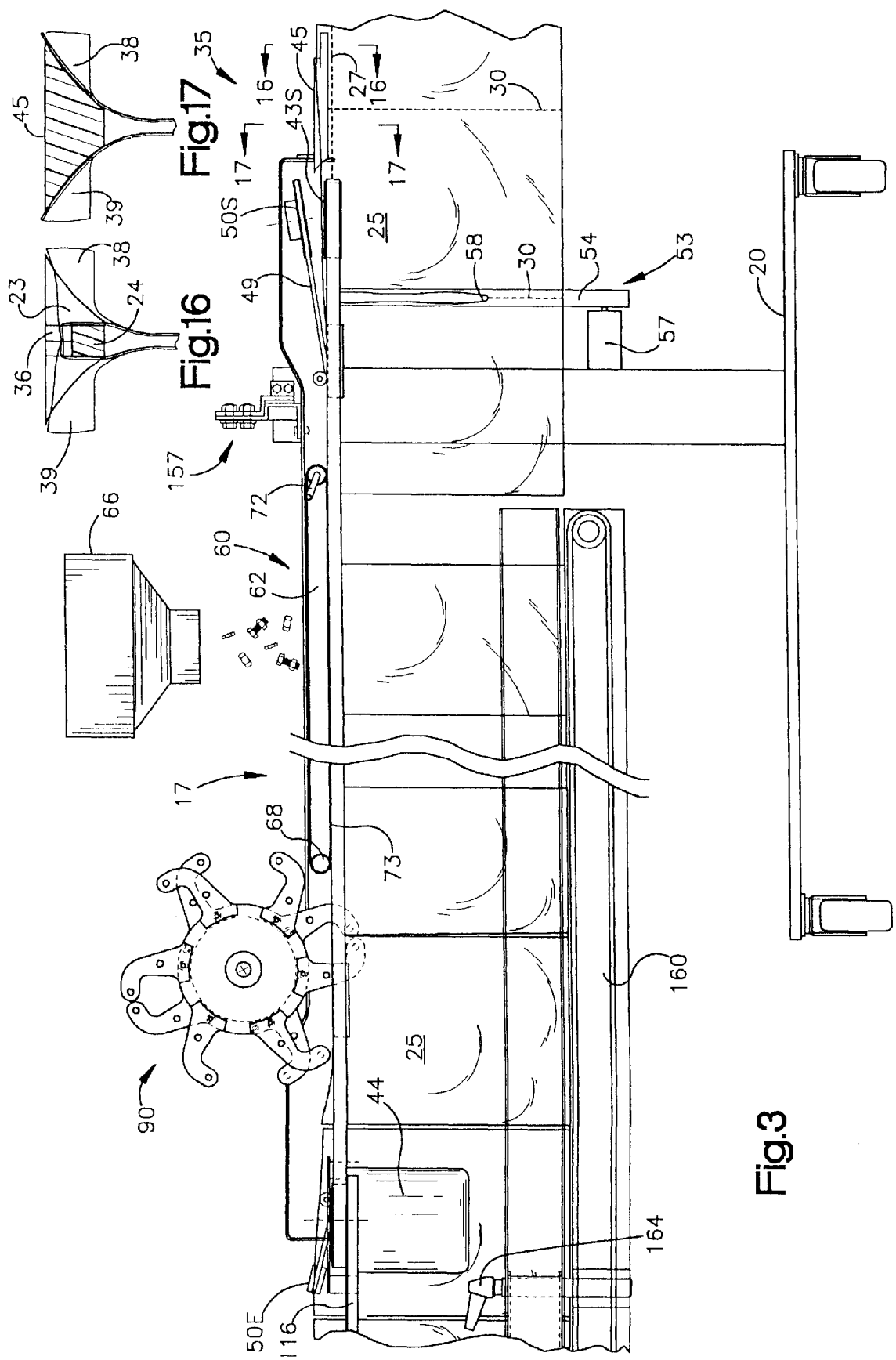

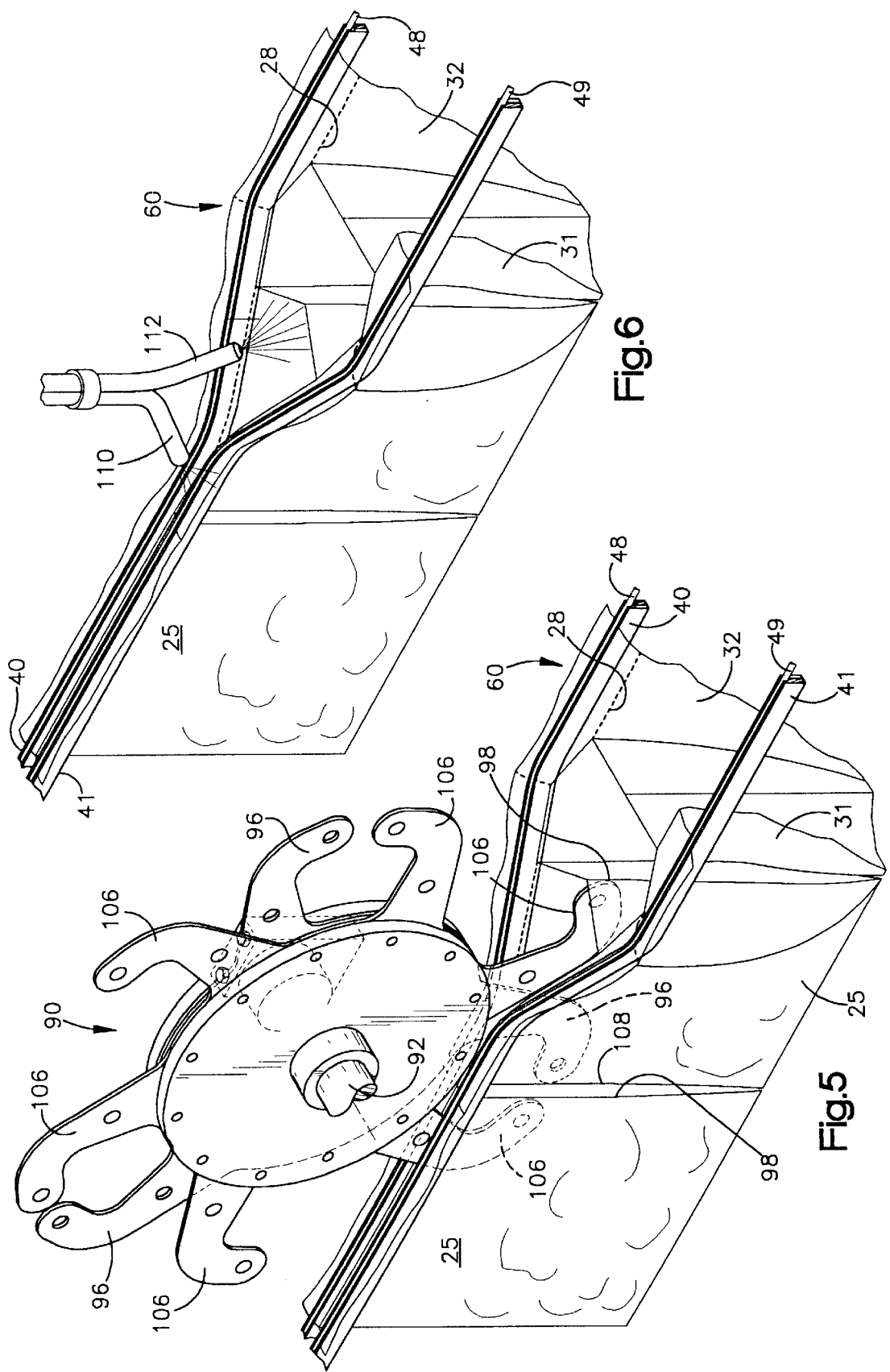

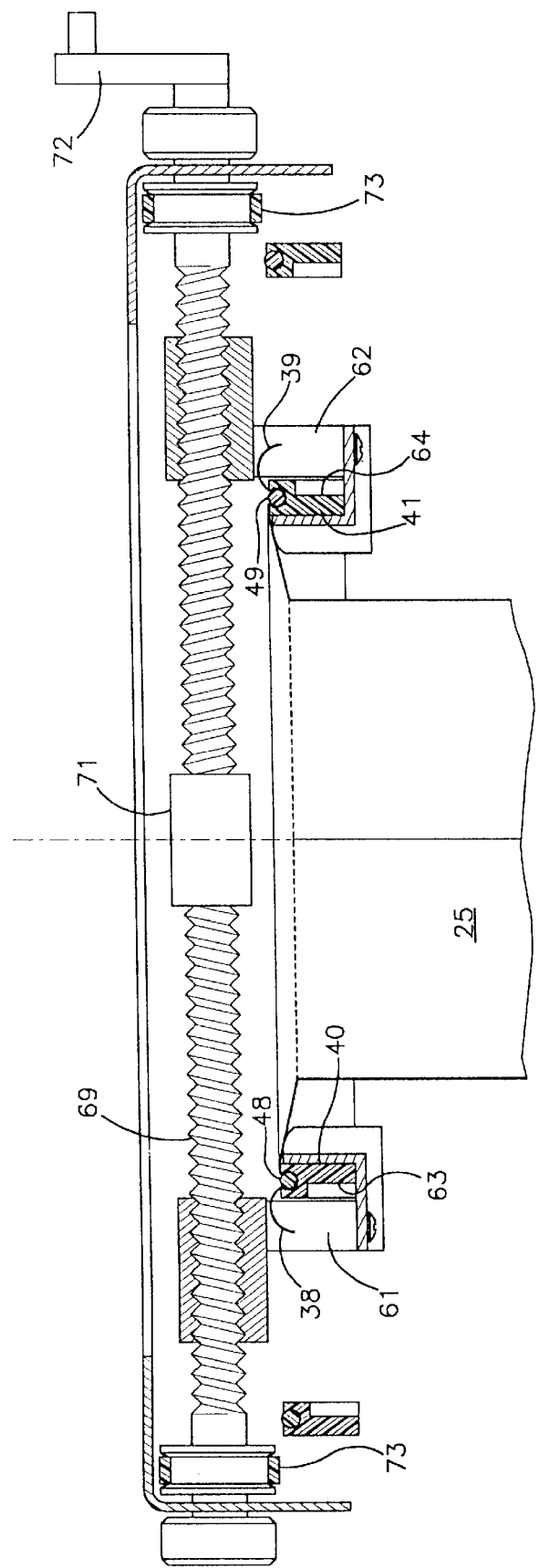

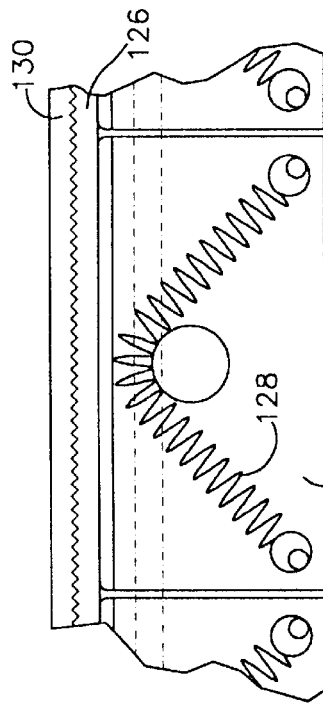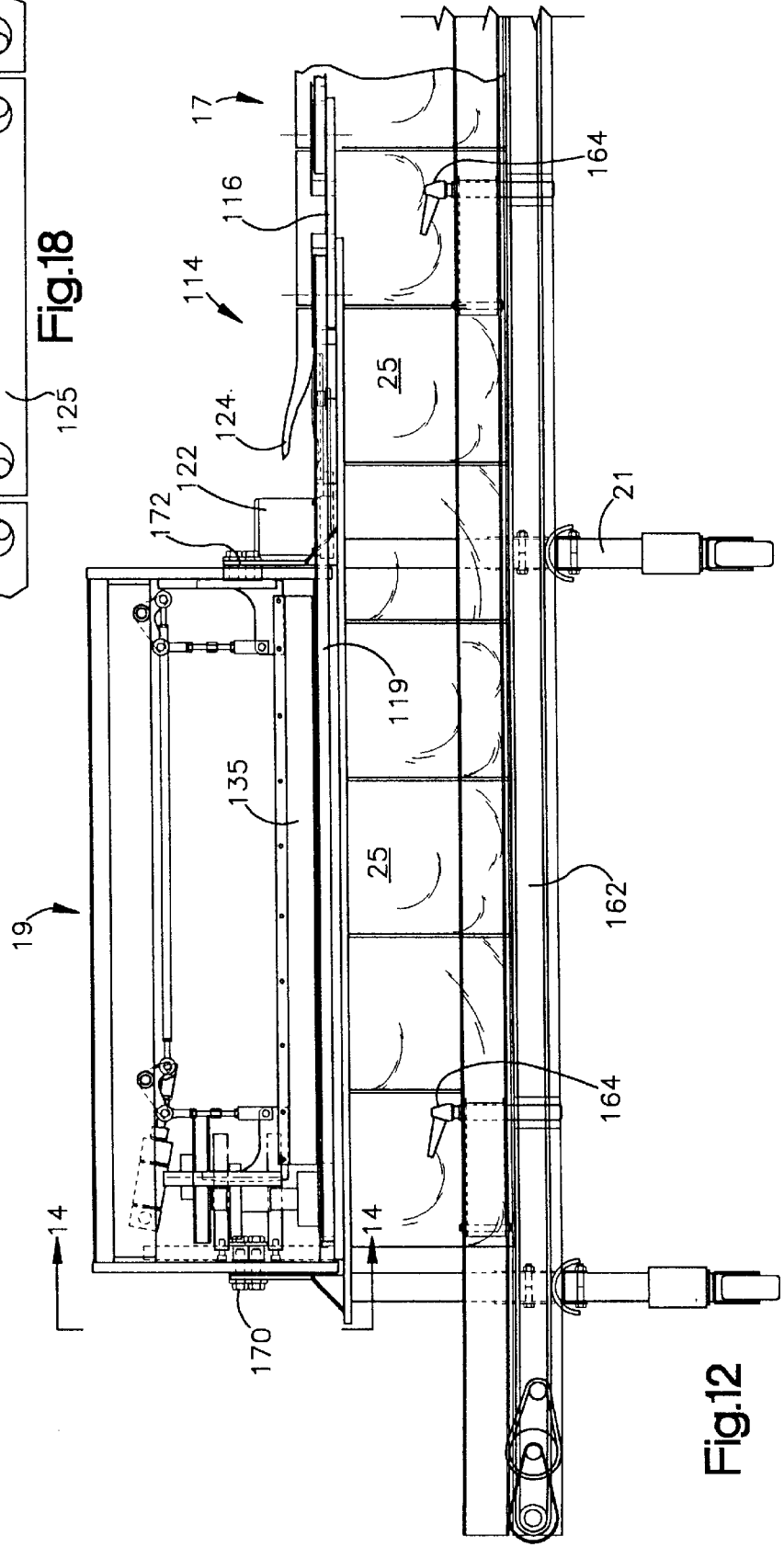

PACKAGING MACHINE, MATERIAL AND METHOD

This is a division of U.S. patent application Ser. No. 08/699,129 filed Aug. 16, 1996, now U.S. Pat. No. 5,743,070 issued Apr. 28, 1998.

This invention relates to packaging machinery and more particularly to a packaging machine and method of packaging which are especially well suited for loading relatively bulky and liquid products sequentially into bags of a novel, side interconnected, chain of bags.

BACKGROUND OF THE INVENTION

U.S. Pat. No. 4,969,310 issued Nov. 13, 1990 to Hershey Lerner et al. under the title Packaging Machine and Method and assigned to the assignee of this patent (the SP Patent) discloses and claims a packaging machine which has enjoyed commercial success. One of the major advantages of the machine of the SP Patent resides in a novel conveyor belt mechanism for gripping upstanding lips of bags of a chain as they are transported along a path of travel and registered at a load station. The firmness with which the lips are gripped makes the machine highly suitable for packaging bulky products which are stuffed into the bags. While the machine of the SP Patent was an advance over the prior art, especially in terms of its lip gripping capability, even greater lip gripping capabilities, if achieved, would be useful in enabling packaging of additional products. Expressed another way, the bag gripping forces of the machine of the SP Patent were dependent on clamping pressure applied between pairs of belts. Thus, while the machine was a definite advance over the art, as to any given bag size, it has a finite maximum stuffing pressure it can withstand without slippage.

Since the bag gripping is dependent on the force with which belt pairs are clamped, the length of the path of travel through the load station is limited. Thus the length of a bag along the path of travel is limited, loading of a bag while it moves along the path of travel is not possible and the concurrent loading of two or more bags is not available.

With the machine of the SP Patent there is an intermittent section which includes the loading station and a continuous section which includes a sealing station. Since the section including the loading station is intermittent, obviously the through-put of the machine is inherently less than could be achieved with a continuously operating loading section.

The machine of the SP Patent had further advantages over the prior art, including an adjustable bag opening mechanism which was adapted to accept a wide range of bag sizes and adjustable to provide a range of bag openings. While an advance over the prior art, the bag openings were six sided so that, like most of the prior art, a rectangular bag opening was not achievable.

Although one prior machine provides rectangular openings, the dimensions of the rectangular openings, both longitudinally and transversely, are limited both by the construction of the chain of bags being filled and by guide rods used to transport the bags. Thus, if an operator wished to change from one opening size to another, another and different web of bags was required. Moreover, to the extent, that the packaging machine could be adjusted to vary the configuration of the rectangular opening, such available adjustment was extremely limited because it required substitution of a different set up guide rods. Further, there was excessive packaging material waste in the form of elongate tubes which slid along the guide rails.

While the machine of the SP Patent has been sold under the designation SP-100V for vertical orientation in which products can be gravity loaded into bags and the designation SP-100H for horizontal loading of stuffable products, neither machine was suitable for adjustment from horizontal to vertical and return, nor for orientation at selected angles of product insertion between the horizontal and the vertical.

A problem has been experienced with prior art sealers having pairs of opposed belts to transport bags through a seal station. The problem is that too frequently due to weight of the products there is slippage of bags relative to the belts and sometimes of the bag fronts relative to the backs resulting in poor seal quality. Alternatively or additionally it is too often necessary to provide a conveyor or other support for bags as they are transported through the sealer station.

SUMMARY OF THE INVENTION

With the machine of the present invention, the described problems of the prior art and others are overcome and an enhanced range of available packaging sizes is achieved. In its preferred form the machine has two, independently moveable carriages which are selectively rigidly interconnected. One of these carriages supports a novel and improved bagging section, while the other supports a closure mechanism. The disclosed closure mechanism is a novel and improved sealing section. Because the machine has two separable carriages other closure carriages supporting other closure mechanisms such as bag ties and staples can readily be used.

Each of the sections is rotatably mounted on its carriage, such that once coupled the two sections may be rotated together about a horizontal axis for product loading, by gravity and/or stuffing when in the vertical and by stuffing when in the horizontal. Advantageously the two sections may also be oriented in any one of a set of angular orientations between the horizontal and the vertical.

A major feature of the present machine is that the loading section opens the bags into rectangular configurations. Not only are the bag load openings rectangular configurations, but the transverse and longitudinal dimensions of such openings for any given bag size are relatively and readily adjustable over a wide range.

The machine may be operated in either a continuous or an intermittent mode at the operator's selection. Both sections are operated in the same mode. That is if the loading section is continuous, so too is the sealing section, while both operate in the intermittent mode at the same times.

One of the outstanding advantages of the invention resides in the utilization of a novel and improved mechanism for gripping upstanding lips of bags as they are transported through the load section. This mechanism utilizes conveyor belts of a type more fully described in a concurrently filed application of Hershey Lerner entitled Plastic Transport System, attorney docket 14-160 (the Belt Patent). The Belt Patent is incorporated in its entirety by reference. Gripping is achieved by coaction of the bags upstanding lips and unique belts such that belt clamping mechanisms are neither required or relied on. To this end a pair of main transport belts are provided and positioned on opposite sides of a path of web travel. In the preferred and disclosed embodiment, each main belt has an upstanding lip contacting surface with a centrally located, transversely speaking, lip receiving recess preferably of arcuate cross-sectional configuration. A pair of lip transport belts of circular cross-section are respectively cammed into the main transport belt recesses to force bag lips into the recesses and fix the lips with a holding power far in excess of that achieved with the prior art.

Since the gripping of bag lips for support is accomplished through coaction of the bag lips and the conveyor belts, there is essentially no limit to the length of the loading station. Rather multiple numbers of open bags can be concurrently conveyed through the loading station. With a machine operating on a continuous basis and a synchronized product supply conveyor adjacent the load station, one is able to concurrently transfer a set of products into a like numbered set of bags with the transfer progressing concurrently as the bags and the conveyed products advance through the load station.

Another advantage of an elongated load station is that one may position a series of vibrator feeders along the station. As an example, a first vibratory feeder could deposit a desired number of bolts in a bag at a first location, a second feeder a like number of washers at a second location downstream from the first, and a third feeder a like number of nuts at a third location still further downstream; thus, eliminating the need for a feed conveyor.

With this arrangement extremely high rates of packaging can be achieved. For example, it is possible to load and seal 130 ten inch bags per minute. Rates achieved with the present machine are rates in excess of those that can be achieved with virtually all, if not all, prior art machines including so called "form and fill" machines.

Another feature of the invention resides in a novel and improved mechanism for breaking frangible interconnections between adjacent sides of successive bags. Assuming the machine to be in its gravity fed horizontal mode, this mechanism comprises a belt which is trained about spaced pulleys which are rotatable about respective horizontal axes. The belt has projecting pins. The belt pulleys are rotated to move the belt in synchronism with positioning of a chain of bags being fed through the load section to cause one of the pins to break the frangible bag interconnections each time a set of such interconnections is longitudinally aligned with the belt.

Moving in the downstream direction of the machine to consider other advances, another feature of the invention is in a novel and improved mechanism for adjusting the width of the load station by varying the spacing between the pairs of main and lip transport belts. This adjustment, which is infinite between maximum and minimum limits, coupled with the novel and improved bag web, provides a wide range of available transverse and longitudinal dimensions of rectangular bag openings for any given chain of like sized interconnected bags.

As loaded bags exit the load station it is desirable to advance the lead side edge and retard the trailing side edge of each bag of a chain to bring inside surfaces of the top portions of each bag back into surface to surface touching orientation for sealing. To this end a novel planetary mechanism is provided. This mechanism is driven by the moving bags themselves to effect the stretching action and reestablish inside surface to surface relationship. For larger bags oppositely directed jets of air are employed which are effective to reestablish the surface to surface orientation.

At an exit from the bagging section of the machine, the main transport belts overlie exit belts which in turn overlie the closure section transport belts, such that the closure section picks up the now longitudinally stretched top surfaces of each loaded bag. As the bags are transferred to the closure section belts, a rotary knife cuts the bags near their tops such that the lip portions that have been carried by the main transport belts are cut off and become recyclable scrap. The elevation of the cutter relative to the heat sealer is adjustable so that the extent to which upper portions of the bags are cut away provides loaded bags sized to be neat, and if desired tight, finished packages.

In order to prevent excessive heating of bags passing through the sealing section and the sealing section belts, the heat source for effecting the seals is shifted away from loaded bags and the belts when the machine is stopped and moved to a location adjacent the bags when the bags are moving. Thus, a mechanism is provided for shifting the heat sealer from a seal forming position to a storage position and return in synchronism with cycling of the machine when in the intermittent mode.

As the loaded bags pass through the seal section, a series of longitudinally aligned, juxtaposed and individually biased, pressure members act against one of the seal section conveyor belts. These pressure members bias the one belt against the bags and thence against the other belt to in turn bias the other belt against a backup element to maintain pressure on the bag tops as they are transported through the seal section. Advantageously, unlike a prior machine of similar construction, individual coil springs are used to bias the pressure members.

The belts used in the seal section are novel and improved special belts which are effective substantially to prevent any product weight induced slippage of the bags relative to the belts. The novel belts are also effective to resist longitudinal movement of the face and back of each bag relative to one another and to the belts. One provision to prevent this relative slippage is providing belts which have corrugated belt engaging surfaces with the corrugations of one belt interlocking with the corrugation of the other to produce a serpentine grip of the face and back of each bag. Further, the preferred belts are metal reinforced polyurethane to provide enhanced resistance to belt stretching. A glue and grit mixture may be applied to the surfaces of the sealer belts, further to inhibit bag slippage. A urethane coating is applied over the glue and grit to complete the improvements provided for the prevention of bag slippage.

The belts of the sealer section are driven by a stepper motor through a positive drive, so that the sealer stepper motor in synchronism with bagger stepper motor maintain belt and bag feed rates of travel that are consistent throughout the length of path of bag travel from supply through to finished package.

Lips of the bags which project from the seal section conveyor belts are heated by a contiguous heat tube sealer having an elongate opening adjacent the path of bag lip travel. Heated air and radiation emanating from this sealer effect heat seals of the upstanding lips to complete a series of packages.

Because the machine sections, unlike the machine of the SP Patent, are either both continuous or both intermittent during machine operation, successive bags passing through the closure section are juxtaposed rather than spaced. This juxtaposition provides improved sealing efficiency and sealer belt life.

A web embodying the present invention is an elongate, flattened, thermoplastic tube having face and back sides which delineate the faces and backs of a set of side by side frangibly interconnected bags. The tube includes an elongate top section which is slit to form lips to be laid over and then fixed in the main transport belts. The top section is interconnected to the bags by face and back, longitudinally endless, lines of weakness which are separated from each side edge toward the center of each bag to the extent necessary to achieve the desired rectangular openings. Thus, the present web is far simpler and less costly than the web of the prior system that provided rectangular bag openings.

The invention also encompasses a process of packaging which includes gripping the upstanding front and back lip portions between main and lip transport belts. The belts are then spread as they pass through a load station pulling bag openings into rectangular configurations as portions of bag tops are separated from the upper lip section. After bag loading, top portions of the bag inner surfaces are returned to abutting engagement, a portion of the lip section is trimmed from the bags, and the bags are sealed or otherwise closed to complete packages.

Accordingly, the objects of this invention are to provide novel and improved packaging machine, packaging materials and methods of forming packages.

IN THE DRAWINGS

FIG. 3 is a foreshortened elevational view of the bagger section as seen from the plane indicated by the line 3—3 of FIG. 1;

FIG. 5 is a perspective view of a portion of the bag flattening mechanism shown in FIG. 4 and on an enlarged scale;

FIG. 6 is a fragmentary perspective view on the scale of FIG. 5 showing an alternate arrangement to the mechanism of FIG. 5 for flattening bags;

Figure 1:
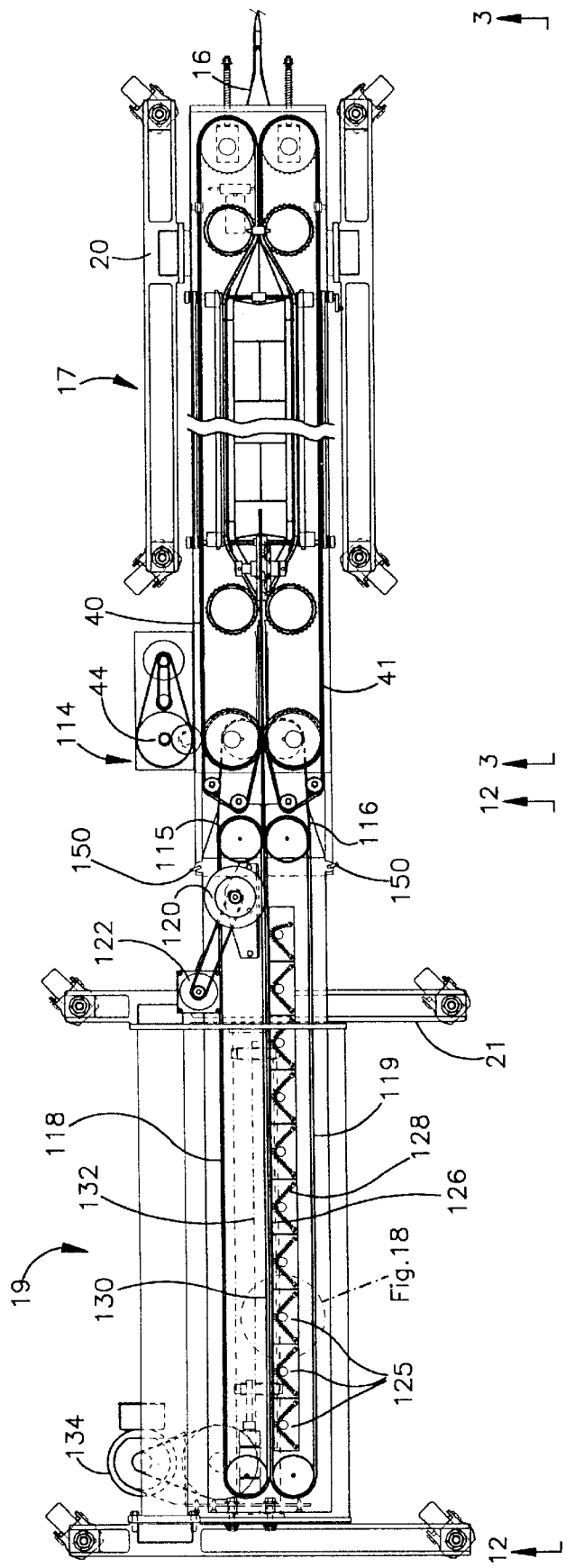
FIG. 1 is a top plan view of the machine of the present invention.
Figure 2:
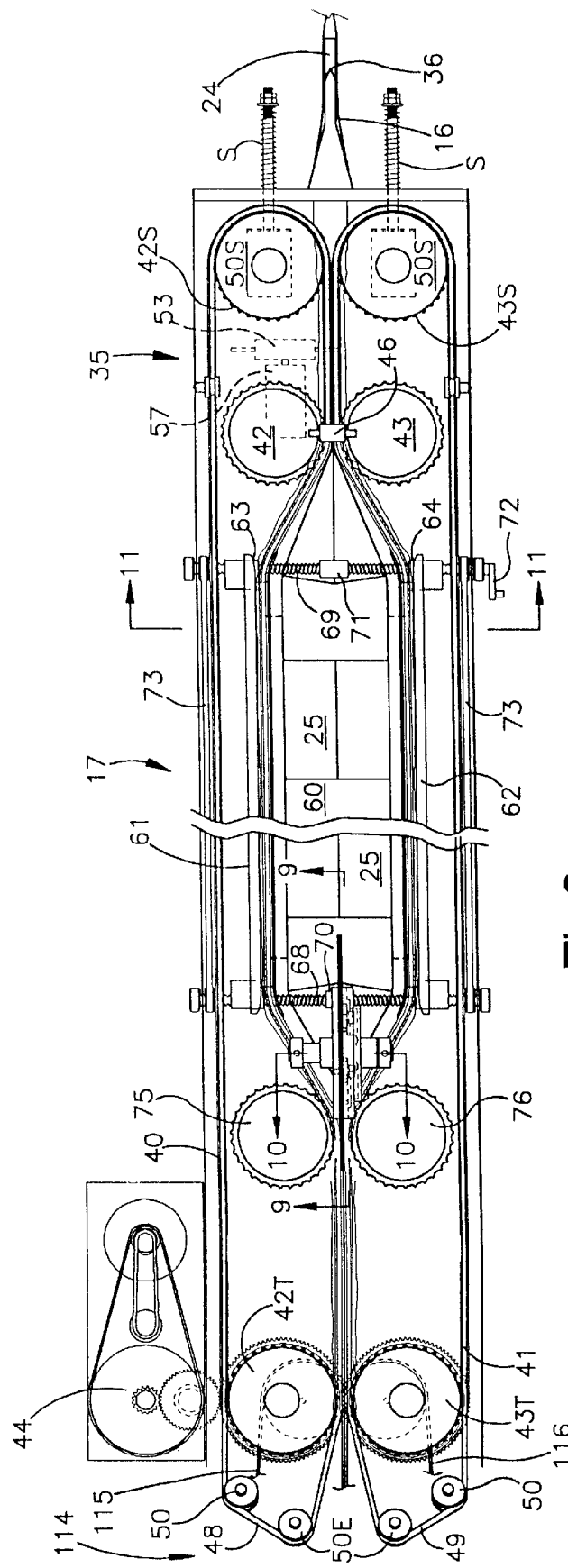
FIG. 2 is a fragmentary top plan view of the bagger section of the machine of FIG. 1 and on an enlarged scale with respect to FIG. 1.
Figure 8:
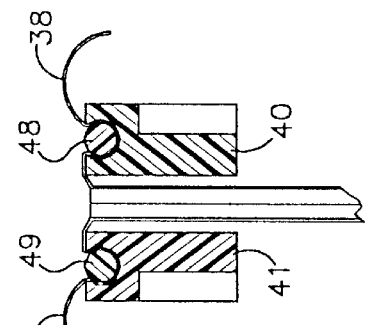
Figure 7:
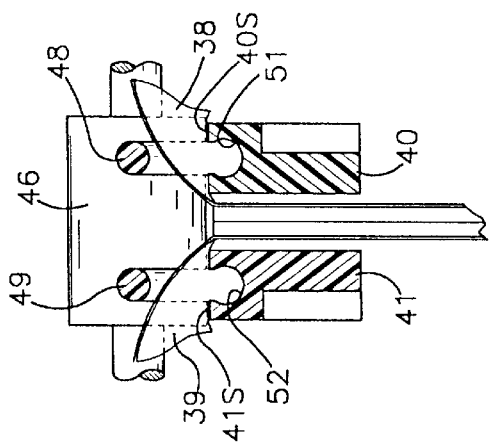
Figure 4:
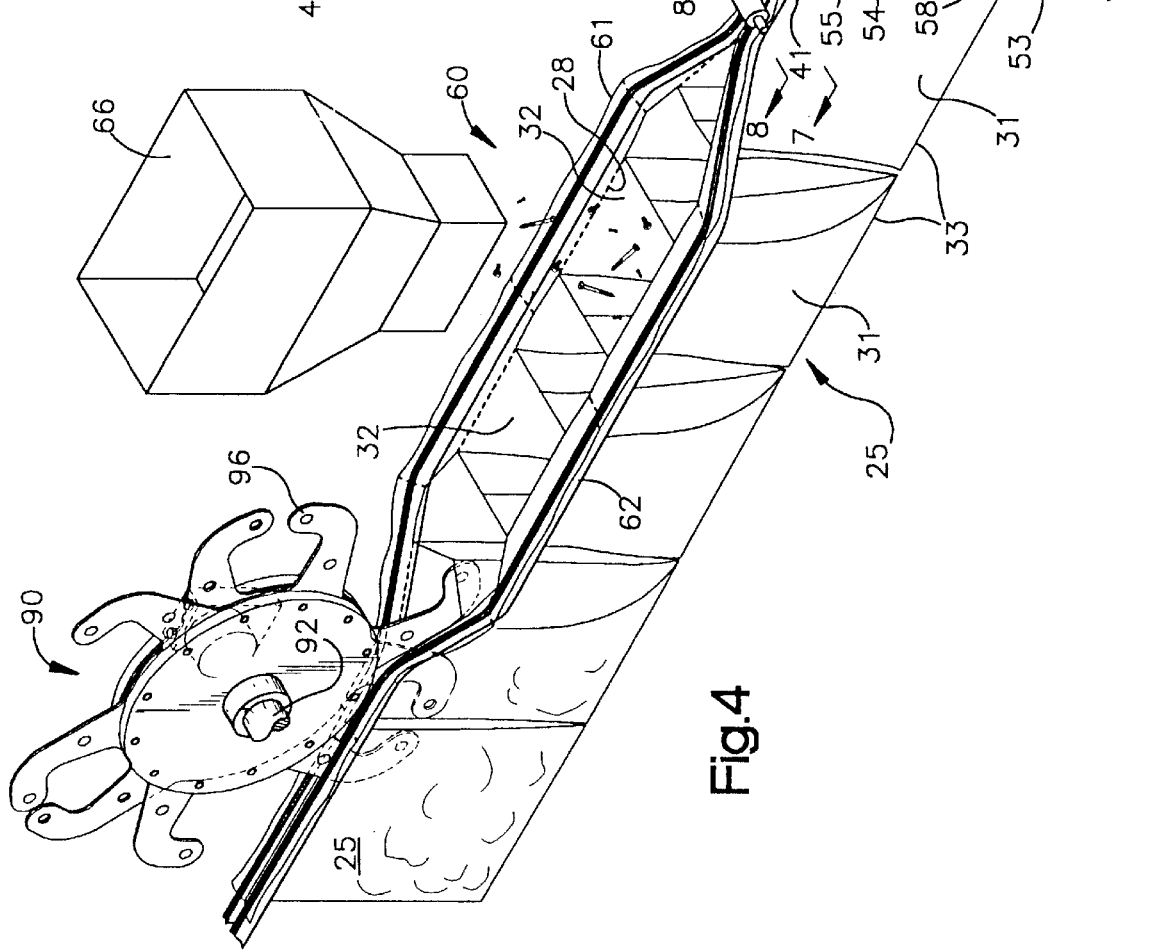
FIG. 4 is a perspective view of the novel and improved bag web of the present invention showing sections of the transport belts transporting the web through the load station and a novel mechanism for providing spacing of the sides of loaded bags particularly of a small size.
Figure 9:
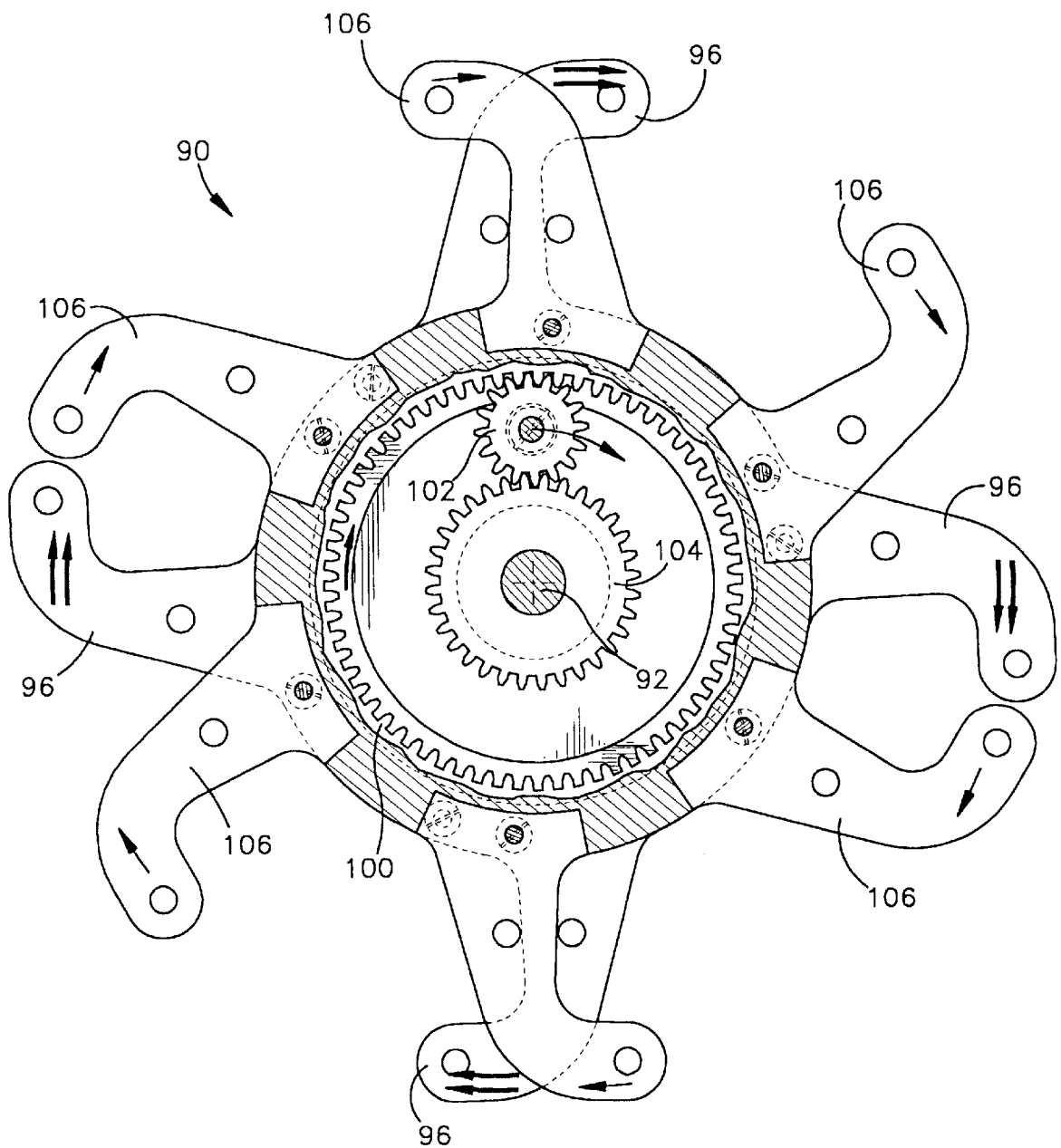
Figure 10:
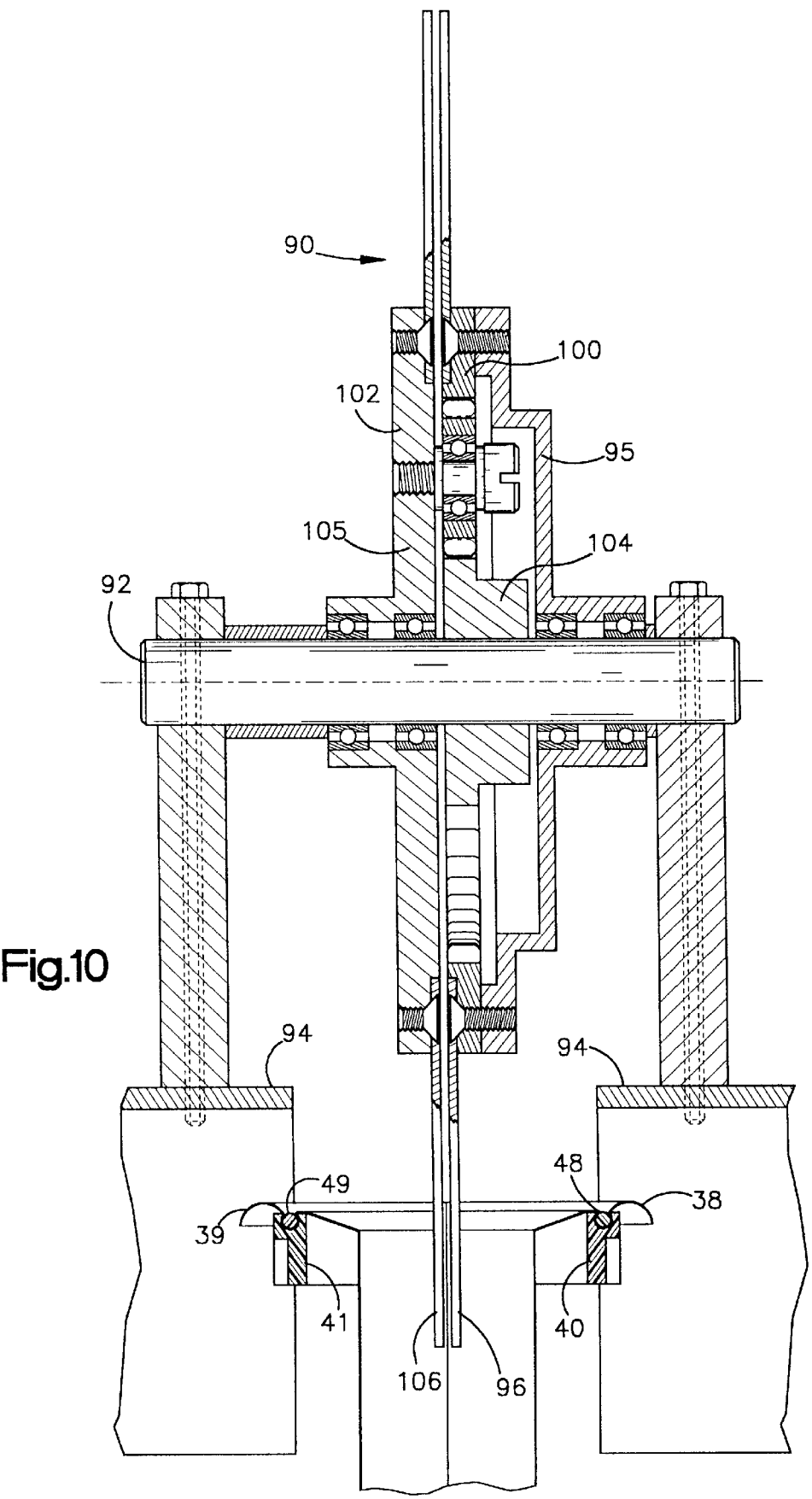
Figure 13:
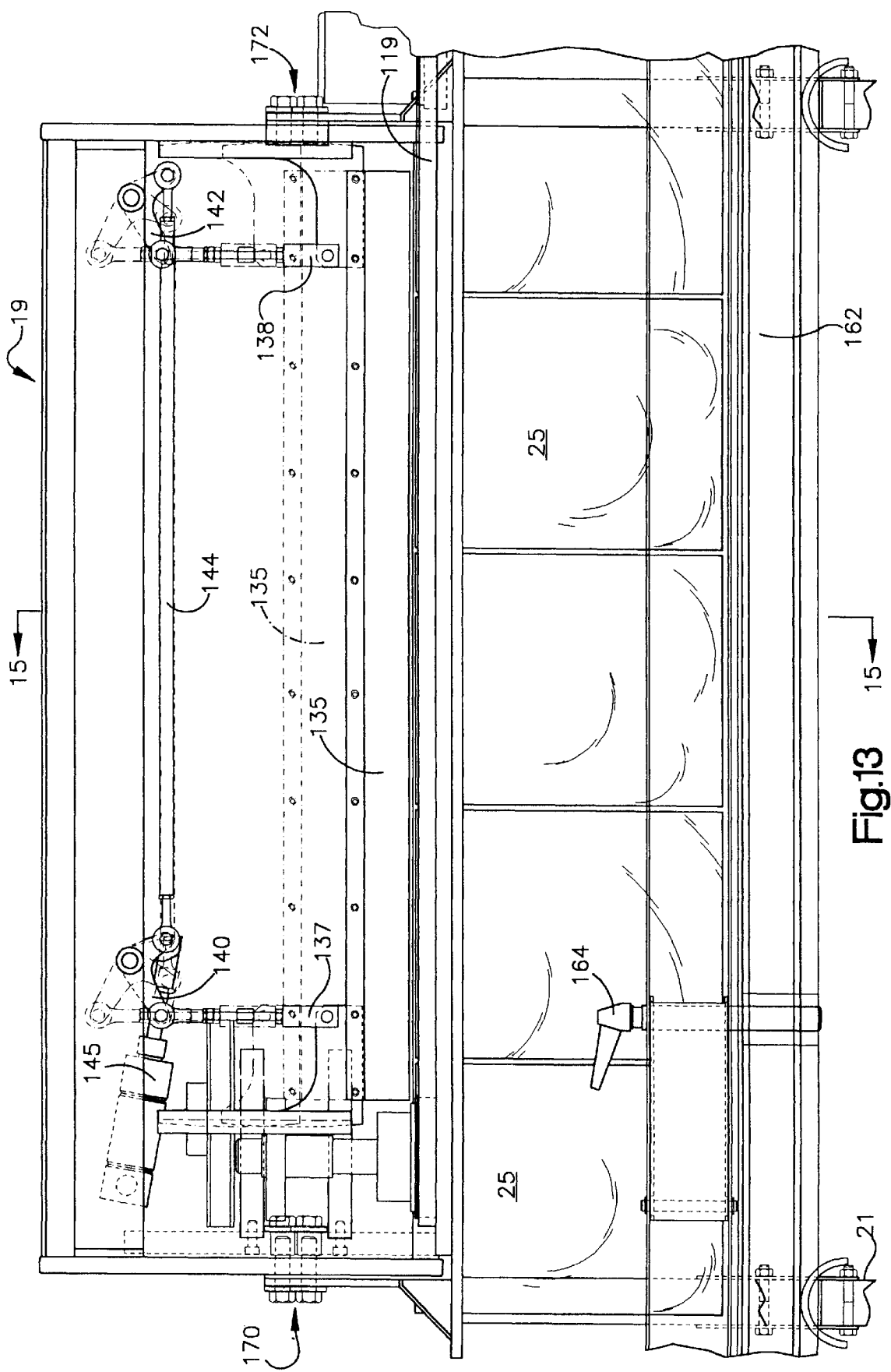
Figure 14:
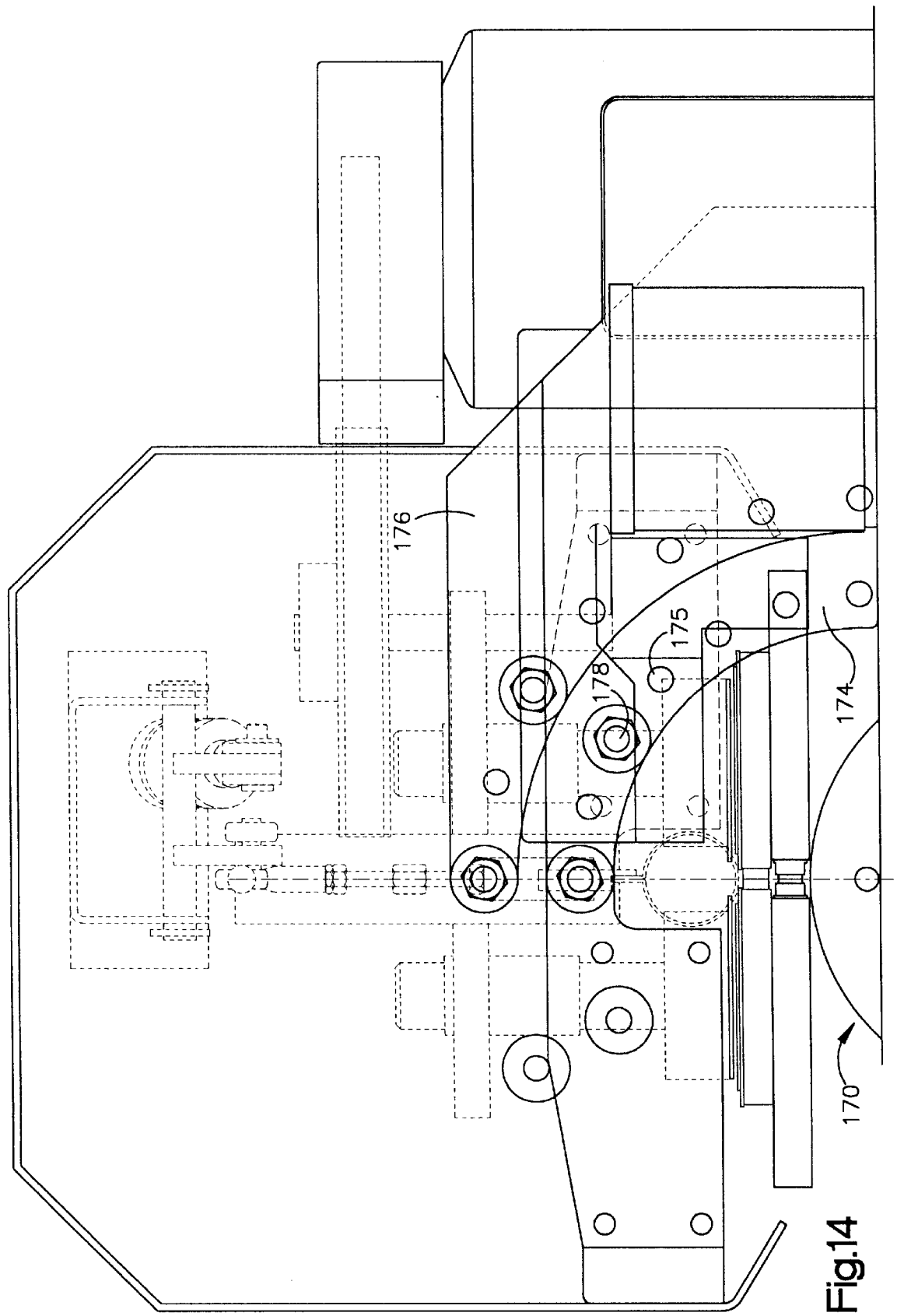
Figure 15:
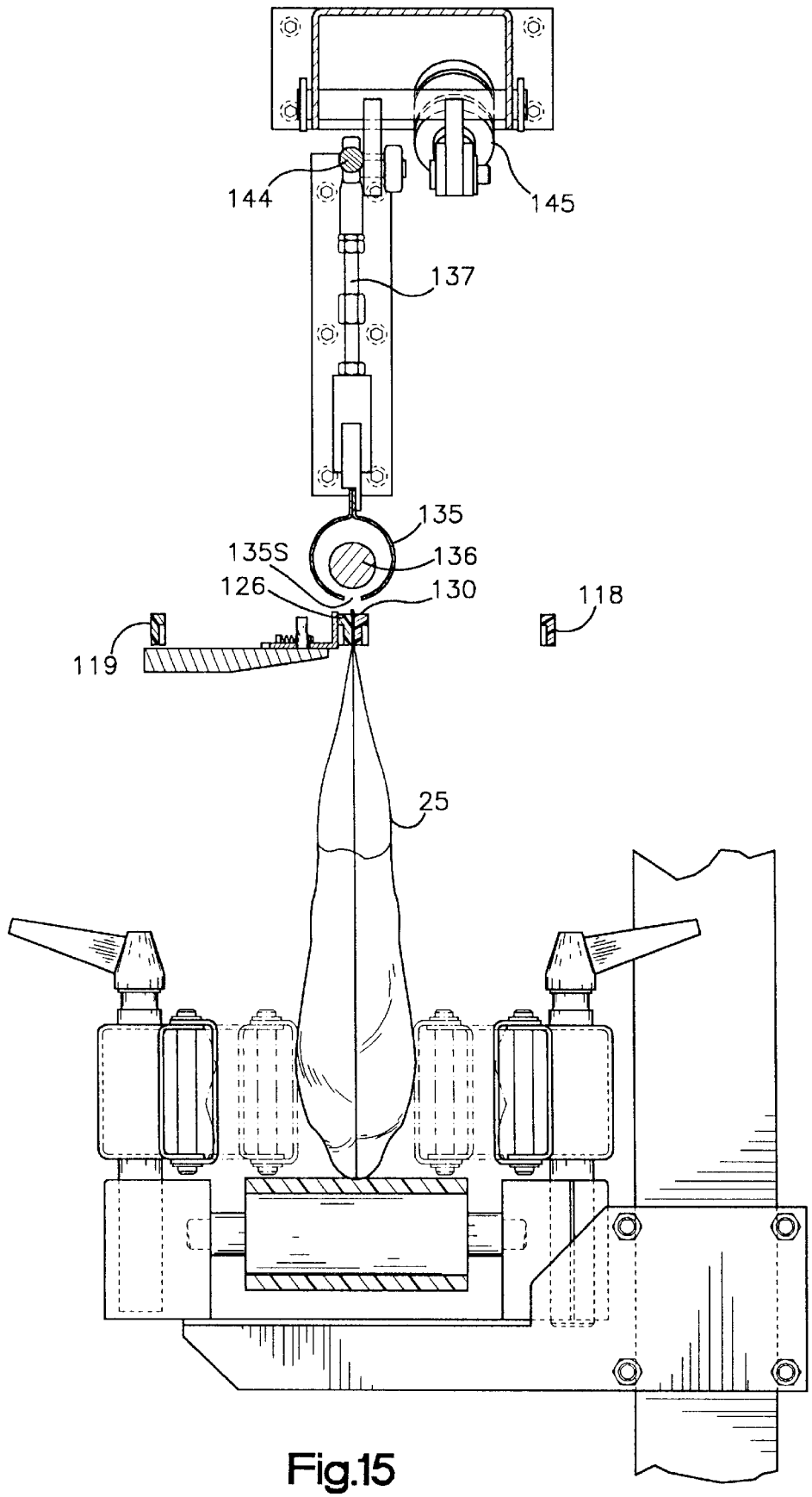
Figure 19:
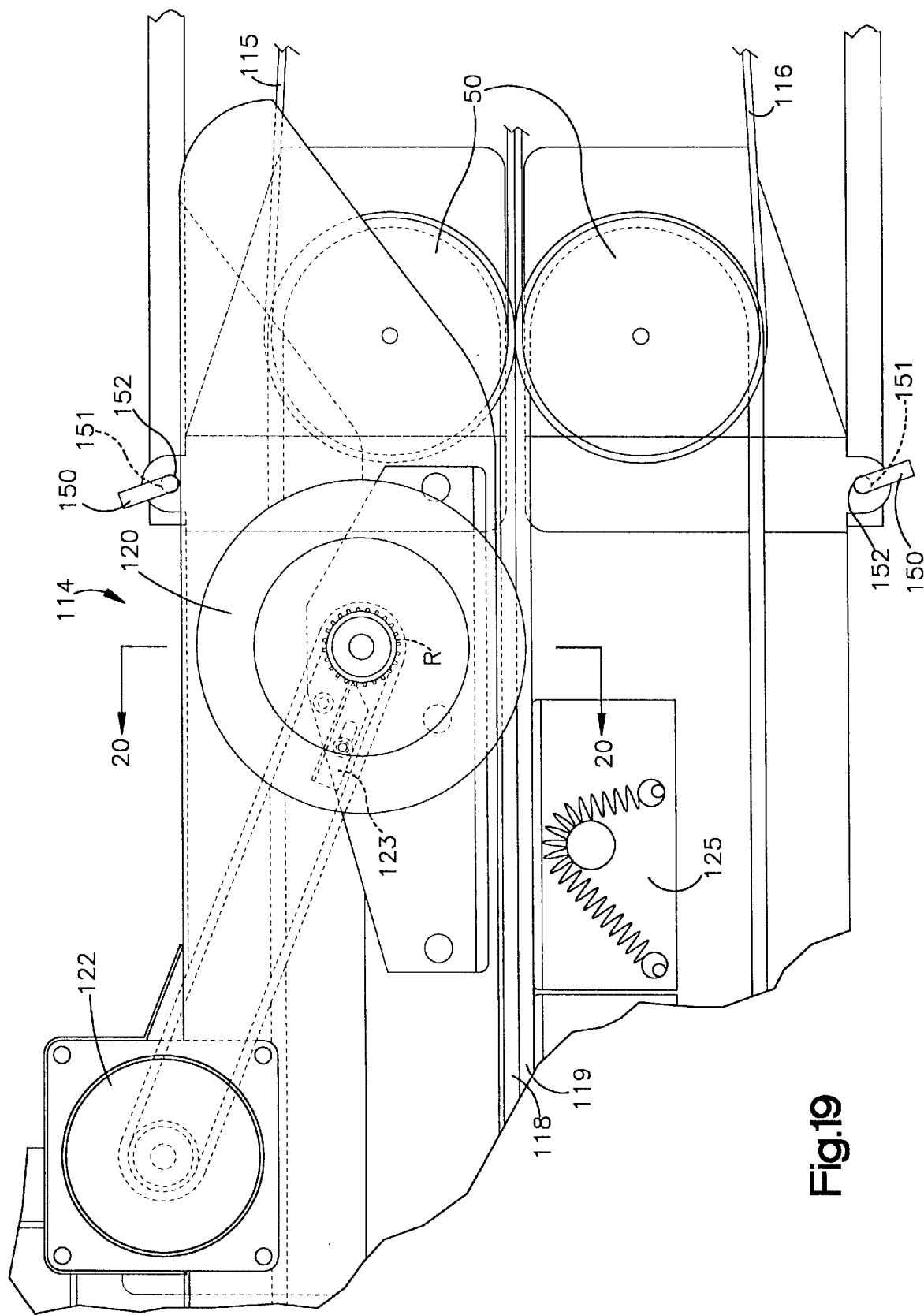
Figure 20:
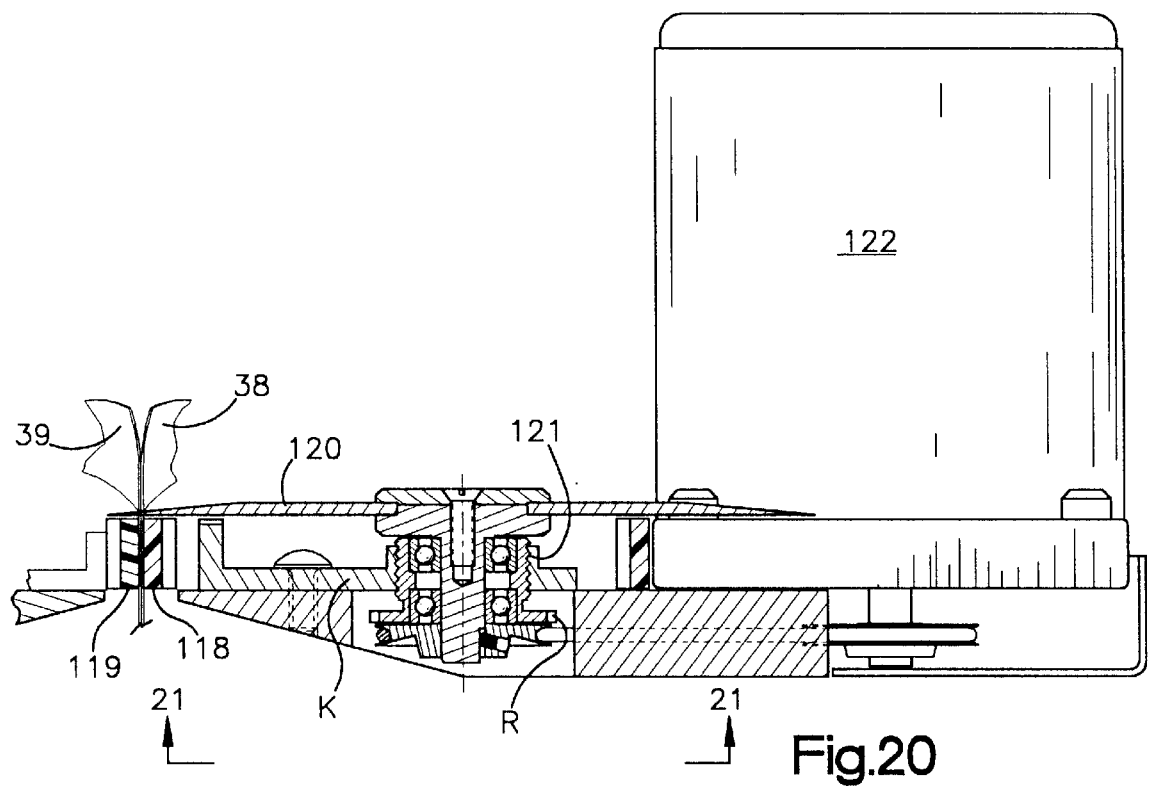
Figure 21:
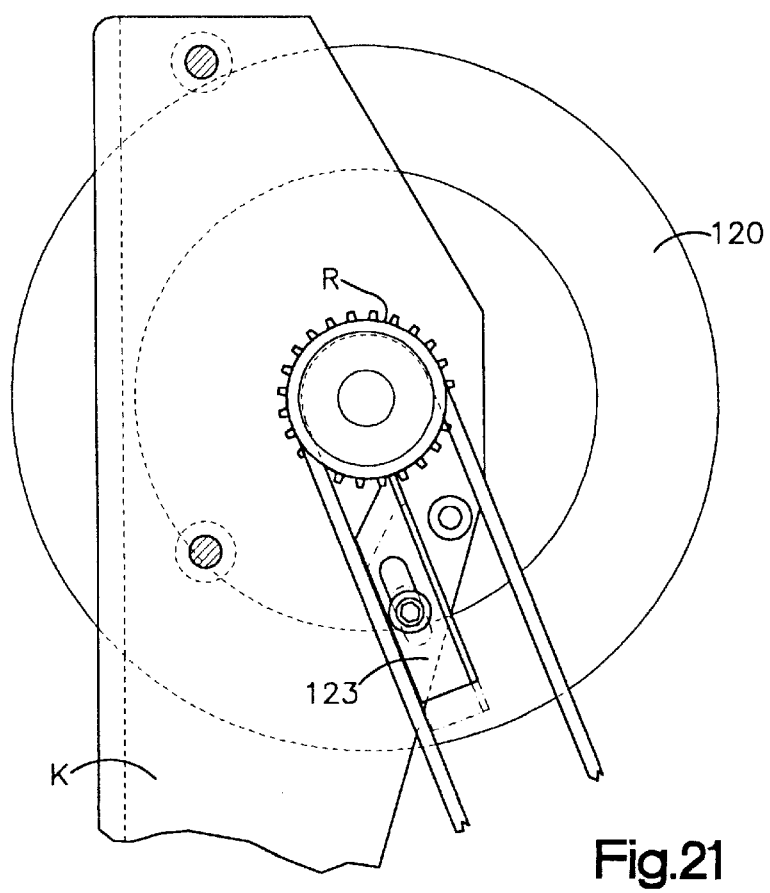
Figure 22:
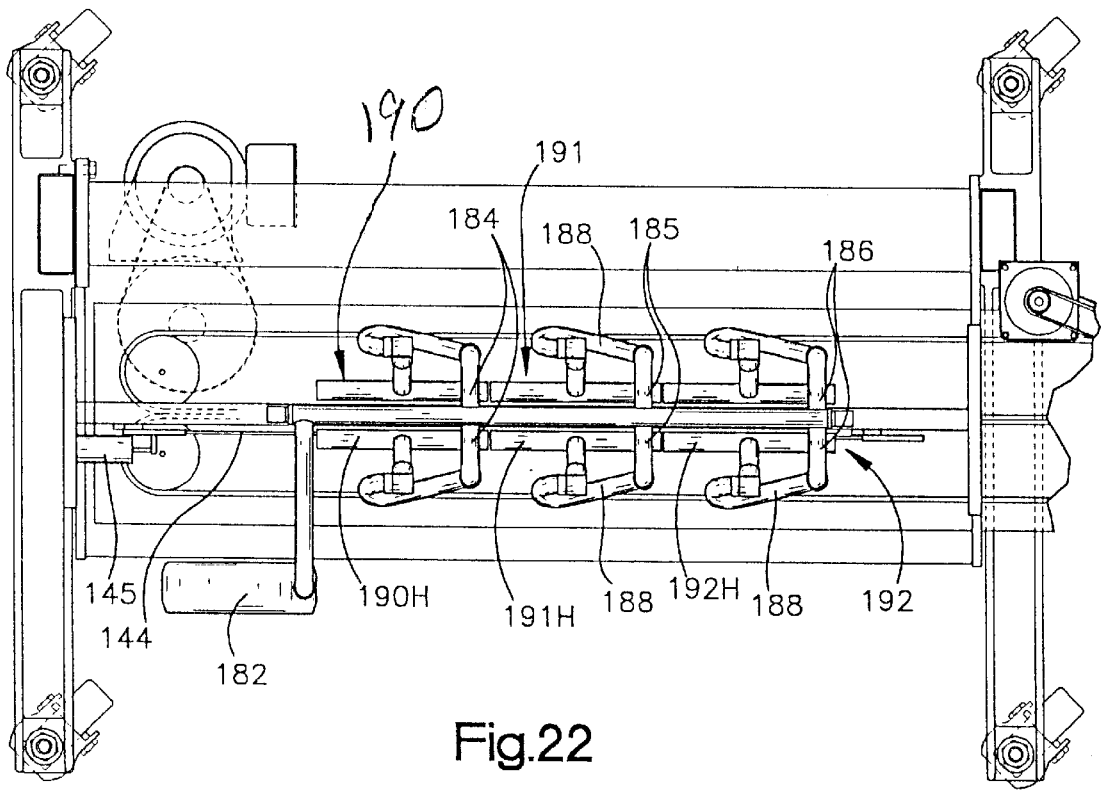
Figure 23:
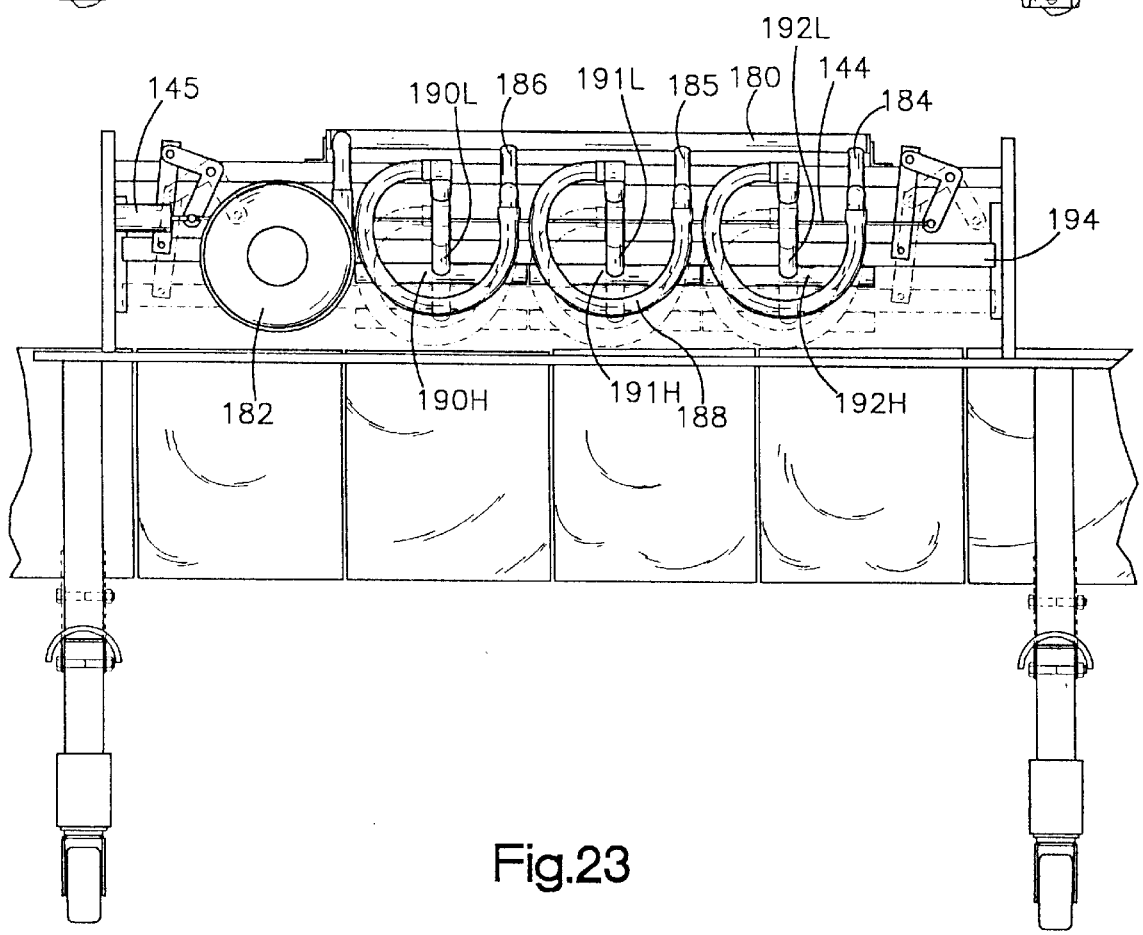

FIGS. 7 and 8 are enlarged sectional views from the planes respectively indicated by the lines 7—7 and 8—8 of FIG. 4 show the main and lip transport belts together with a fragmentary top portion of the bag as bag lips are folded over the main transport belts and then trapped in the grooves of the main belts;

FIG. 9 is a sectional view of the bag flattening or stretching mechanism of FIGS. 4 and 5 as seen from the plane indicated by the line 9—9 of FIG. 2;

FIG. 10 is an enlarged sectional view of the mechanism of FIG. 9 as seen from the plane indicated by the line 10—10 of FIG. 2;

FIG. 11 is an enlarged, fragmentary, sectional view of the transport belt spacing adjustment mechanism as seen from the plane indicated by the lines 11—11 of FIG. 2;

FIG. 12 is an elevational view of a portion of the machine as seen from the plane indicated by the line 12—12 of FIG. 1 showing a bag support conveyor underneath the loading and seal sections;

FIG. 13 is an elevational view of the seal section on an enlarged scale with respect to FIG. 12;

FIG. 14 is an elevational view of the angular orientation maintenance mechanism on an enlarged scale with respect to other of the drawings and as seen from the plane indicated by the line 14—14 of FIG. 12;

FIG. 15 is an enlarged sectional view of the sealer positioning mechanism and a bag support conveyor as seen from the plane indicated by the lines 15—15 of FIG. 13;

FIG. 16 is a sectional view of a web guide as seen from the plane indicated by the line 16—16 of FIG. 3;

FIG. 17 is a sectional view of the lip plow as seen from the plane indicated by the line 17—17 of FIG. 3;

FIG. 18 is an enlarged plan view of a force application element and a fragmentary plan view of the sealer belts;

FIG. 19 is an enlarged fragmentary plan view of a transfer location between the bagger and the closure sections, including a knife for trimming the tops of loaded bags prior to closure;

FIG. 20 is a further enlarged sectional view of the structure of FIG. 19 as seen from the plane indicated by the line 20—20 of FIG. 19;

FIG. 21 is a still further enlarged view of the knife and its height adjustment mechanism as seen from the plane indicated by the line 21—21 of FIG. 20;

FIG. 22 is a plan view of an alternate and preferred sealer for the, closure section; and, FIG. 23 is an elevational view of the sealer of FIG. 22.

DETAILED DESCRIPTION OF THE PREFERRED EMBODIMENT

I. The Overall Machine

Referring to FIGS. 1 and 4 a web 15 of side connected bags is provided. The web 15 is fed from a supply shown schematically at 16 to a bagger section 17. The bagger section 17 is separably connected to a sealer section 19. The bagger and sealer sections respectively include wheeled support carriages 20, 21. The support carriages 20, 21 respectively include support frames for supporting bagging and sealing mechanisms.

In the drawings the bagging and sealing mechanisms are shown in their vertical orientations for, gravity loading. The machine will be described in such orientation it being recognized that, as described more fully in section IV, the mechanisms may be positioned in a horizontal orientation and at other angular orientations.

II. The Web 15

The web 15 is an elongated flattened plastic tube, typically formed of polyethylene. The tube includes a top section 23 for feeding along a mandrel 24, FIGS. 4 and 16. The top section 23 is connected to the tops of a chain of side connected bags 25 by front and back lines of weakness in the form of perforations 27, 28. Frangible connections 30 connect, adjacent bag side edges, FIGS. 3 and 4. Each bag 25 includes a face 31 and a back 32 interconnected at a bottom 33 by a selected one of a fold or a seal. Side seals adjacent the interconnections 30 delineate the sides of the bags 25. The bag faces and backs 31, 32 are respectively connected to the top section 23 by the lines of weakness 27, 28, such that the top section 23 when the web is flattened itself is essentially a tube.

III. The Bagger Section 17

A. A Bag Feed and Preparation Portion 35

The web 15 is fed from the supply 16 into a bag feed and preparation portion 35 of the bagger section 17. The feed is over the mandrel 24 and past a slitter 36, FIG. 4. The slitter 36 separates the top section 23 into opposed face and back lips 38, 39. The feed through the bag feed and preparation portion 35 is caused by a pair of endless, oppositely rotating, main transport belts 40, 41 supported by oppositely rotating pulley sets 42, 43. The main belts 40, 41 are driven by a stepper motor 44, FIG. 3 through toothed pulleys 42T, 43T of the sets 42, 43. Other of the pulleys 42S, 43S are spring biased by springs S, FIG. 2, to tension the belts.

A plow 45 is provided and shown in FIGS. 3, 4 and 17. For clarity of illustration the slitter and the plow have been omitted from FIG. 1. The plow is positioned a short distance upstream from a roller cam 46. As the lips are drawn along by the main transport belts 41, 42, the lips 38, 39 are respectively folded over the top bag engaging surfaces 41S, 42S, of the main transport belts under the action of the plow 45 as depicted in FIG. 7.

Once the lips are folded over the tops of the main transport belts 41, 42, the roller cam 46 presses endless, lip transport and clamp belts 48, 49 into complemental grooves 51, 52 in the main transport belts 41, 42 respectively. Thus, the grooves 51, 52 function as bag clamping surfaces that are complemental with the clamping belts 48, 49. More specifically, the clamp belts are circular in cross section, while the grooves 51, 52 are segments of circles, slightly more than 180° in extent. The camming of the clamp belts into the grooves traps the lips 38, 39 between the clamp belts and the grooves. The lip clamping firmly secures the lips between the coacting belt pairs such that the lips, due to their coaction with the belts, are capable of resisting substantial stuffing forces as products are forced into the bags at a load station 60. Sections of the clamp belts which are not in the grooves 51, 52 are trained around a set of lip transport belt pulleys 50.

A bag side separator mechanism 53 is provided at a bag connection breaking station. The separator mechanism 53 includes an endless belt 54 which is trained around a pair of spaced pulleys 55 to provide spans which, as shown in FIGS. 3 and 4, are vertical. The pulleys 55 are driven by a motor 57, FIG. 2. As the belt is driven breaking pins 58 projecting from the belt 54 pass between adjacent sides of bags to break the frangible interconnections 30. Thus, as the bags depart the bag feed and preparation portion 35, they are separated from one another but remain connected to the lips 38, 39.

B. The Load Station 60

The load station 60 includes a pair of parallel belt spreaders 61, 62. The belt spreaders are mirror images of one another. As is best seen in FIG. 11, the belt spreaders respectively include channels 63, 64. The channels 63, 64 respectively guide the main transport belts 40,41, on either side of the load station 60. When the transport belts 40,41, are in the channels 63, 64, as is clearly seen in FIGS. 4 and 11, the bags 25 are stretched between the belts in a rectangular top opening configuration.

A schematic showing of a supply funnel 66 is included in FIG. 4. As suggested by that figure, the products to be packaged are deposited through the rectangular bag openings each time a bag is registered with the supply funnel at the load station.

A space adjusting mechanism is provided. This mechanism includes a spaced pair of adjustment screws 68, 69, FIG. 2. The adjustment screw 68, 69 are respectively centrally journaled by bearings 70, 71. The screws have oppositely threaded sections on either side of their bearings 70, 71 which threadably engage the belt spreaders 61, 62. Rotation of a crank 72 causes rotation of the adjustment screw 69. The screw 69 is connected to the screw 70 via belts or chains 73, which function to transmit rotation forces so that when the crank 72 is operated the screws 68, 69 are moved equally to drive the spreaders equally into an adjusted spacial, but still parallel, relationship.

As the spreaders are movably adjusted toward and away from one another, the spring biased pulleys 42S, 43S maintain tension on the main transport belts 40, 41 while permitting relative movement of spans of the belts passing through the spreader channels 63, 64. Similarly, spring biased lip transport belt pulleys 50S maintain tension on the clamp belts 48, 49. The spring biased pulleys of both sets are the pulleys to the right as seen in FIG. 2, i.e. the entrance end pulleys in the bag feed and preparation portion 35.

The main transport pulley sets 42, 43 include two idler pulleys 75, 76 downstream from the load station 60. The idler pulleys 75, 76 are relatively closely spaced to return the main transport belts 40, 41 into substantially juxtaposed relationship following exit from the load station 60.

C. Bag Stretching

As loaded,bags exit the load station, it is desirable to return upper portions of the bag faces and backs into juxtaposition. To facilitate this return with smaller bags a novel and improved planetary stretcher 90 is provided. This planetary bag stretcher is best understood by reference to FIGS. 5, 9 and 10. The stretcher 90 includes a support shaft 92 mounted on frame members 94 of the bagger section, FIG. 10.

The planetary stretcher includes a bag trailing edge engaging element 95. The element 95 includes six bag engaging fingers 96. As is best seen in FIGS. 4 and 5, one of those fingers 96 is shown in a lead one of the bags 25 while the next finger is being moved into the next bag in line as the next bag departs the load station 60. As the bags move from right to left as viewed in FIG. 5, an internal ring gear portion 100 drives a planet gear 102. The planet gear orbits a fixed sun pinion 104. The planet gear is journaled on and carried by a lead edge engaging element 105 journaled on the shaft 92. The lead edge engaging element 105 has four fingers 106 which orbit at one and a half times the rate of the fingers 96. Rotation of the lead edge engaging element causes one of the fingers 106 to enter the next bag as it exits the load station and to engage a leading edge 108 of the bag, thereby stretching the bag until top portions of the bag face and back are brought into juxtaposition.

For larger bags this stretching of the now loaded bags as they exit the load station is accomplished with jets of air from nozzles 110, 112 which respectively blow against the lead and trailing edges of the bag, thus stretching the bags from their rectangular orientation into a face to back juxtaposed relationship as the transport belts are returned to juxtaposition.

D. A Transfer Location

After loaded bags have exited the load station 60 and the face and back of each bag have been brought into juxtaposition, the loaded bags are transferred to the closure section 19 at a transfer location 114. Exit conveyors 115, 116 underlie the main transport belts 40, 41 at an exit end of the bagger section 17. Loaded bags are transferred from the main transport belts to the exit conveyors. The exit conveyors in turn transfer the loaded bags to closure section conveyor belts 118, 119.

Referring to FIGS. 19–21, a rotary knife 120 is positioned a short distance downstream from the exit conveyors. The knife is rotatively mounted in an externally threaded support tube 121. The tube in turn is threadedly connected to a knife support frame section K. An adjustment lock 123 is slidably carried by the frame section K. When the lock 123 is in the position shown in solid lines in FIG. 21, it engages a selected one of a plurality of recesses R in the perimeter of the support tube 121 to fix the knife in an adjusted height position. When the lock 123 is slid to the phantom line position of FIG. 21, the tube 121 may be rotated to adjust the vertical location of the knife 120.

The knife 120 is driven by a motor 122 to sever the bag lip portions 38, 39, leaving only closure parts of the lip portions for closure, in the disclosed arrangement, by heat sealing. The trimmed plastic scrap 124, FIG. 12, from the severed lip portions is drawn from the machine with a conventional mechanism, not shown, and thereafter recycled.

IV. The Closure Section 19

As is best seen in FIG. 1, the novel and improved sealer includes a plurality of independently movable force application elements 125. One of the force elements is shown on an enlarged scale in FIG. 18. The force elements 125 slidably engage the outer surface of a bag engaging run 126 of the belt of the conveyor 119. Springs 128 bias the elements 125 to clamp the bag faces and backs together against a coacting run 130 of the conveyor belt 118. A backup 132 slidably engages the coacting run 130 to resist the spring biased force of the application elements 125.

A stepper motor 134, FIG. 1, is drivingly connected to the closure section conveyor belts 118, 119 to operate in synchronism with the stepper motor 44 of the bagger section, either intermittently or continuously.

As is best seen in FIGS. 13 and 15, a beater tube 135 is provided. A heat element 136, FIG. 15, is positioned within the tube to provide heat to fuse upstanding bag lips when the heater tube 135 is in the position shown in solid lines in FIG. 13. The heat transfer to the lips is effected by both radiation and convection through an elongate slot 135S in the bottom of the tube.

The heater tube 135 is connected to a pair of supports 137, 138. When the bags 25 are vertical the heater tube 135 is suspended by the supports 137, 138. The supports in turn are pivotally connected to and supported by a pair of cranks 140, 142. The cranks 140, 142 are pivotally supported by a section of the frame of the sealer carriage 21. The cranks 140, 142 are interconnected by a rod 144 which in turn is driven by an air cylinder 145. The air cylinder 145 is interposed between the carriage frame and the rod 144. Reciprocation of the air cylinder is effective to move the heat tube between its seal position shown in solid lines and a storage position shown in phantom, FIG. 13. When the conveyor belts 118, 119 are operating to transport bags through the closure section the sealer is down, while whenever the machine is stopped the sealer is shifted to its storage or phantom position of FIG. 13.

As is best seen in FIG. 18, the adjacent runs 126, 130 of the sealer conveyor belts 118, 119 have surfaces that are corrugated and interfitting. These interfittings corrugations provide both enhanced bag gripping and holding power and resistance to relative longitudinal movement of the runs as well as the faces and backs of the bag. The gripping and holding power of the belts is further enhanced by coating the belts with a glue and sand slurry and applying a polyurethane coating over the slurry to further enhance the frictional grip of the belts on bags being transported. The combined effects of the belt corrugations and coating substantially prevent slippage of the bags due to weight in the bags.

V. Section Interconnection and Adjustments

A. Section Interconnection

The bagger and closure sections 17,19 are physically interconnected when in use. In the disclosed arrangement this interconnection includes a pair of lock bars 150. The lock bars which are removably positioned in apertures 151,152 formed in bosses 154,155 respectively projecting from frames of the bagger and closure stations 17,19.

B. Angular Positioning

As has been indicated, the bagger and closure sections are adjustable to horizontal or vertical orientations as well as angular orientations between the horizontal and the vertical.

The bagger section 17 is rotatably supported on a pair of trunions one of which is shown at 157 in FIG. 3. As can best be seen in FIGS. 12 and 13, the sealer section 19 is rotatably supported on the carriage 21 by spaced trunions 170, 172. The trunions 157,170 & 172 are axially aligned. The end trunion 170, to the left as viewed in FIGS. 12 and 13, is associated with an angular position holder. The holder includes an apertured plate 174 secured to and forming part of the frame of the carriage 21, FIG. 14. The plate 174 includes a set of apertures 175 spaced at 15° intervals to provide incremental angular adjustments of 15° each between the horizontal and vertical orientations of the machine. Each of the apertures 175 may be selectively aligned with an aperture in a sealing section plate 176. A pin in the form of a bolt 178 projects through aligned apertures to fix the sealer section and the interconnected bagger section in a selected angular orientation.

VI. A Support Conveyor

While there normally is no need for bottom support of the bags 25 as they pass through the bagger section 17, nonetheless a conventional support conveyor 160 may be provided, see FIG. 3. More frequently a conveyor 162 will be provided under the closure section 19. In either event, suitable height adjustment and locking mechanisms 164 are provided to locate the conveyors 160,162 in appropriate position to support the weight of loaded bags being processed into packages.

VII. The Preferred Sealer

Referring to FIGS. 22 and 23, the preferred sealer for the closure mechanism is disclosed. The sealer includes an air manifold 180 for receiving air from a blower 182. In an experimental prototype a 300 cubic foot per minute variable pressure blower was used to determine optimized air flows and pressures.

The manifold 180 has three pairs of oppositely disposed outlets 184,185,186. Each outlet is connected to an associated one of six flexible tubes 188. The tubes in turn are connected to pairs of oppositely disposed, T-shaped sealer units 190,191,192 to respectively connect them to the outlets 184,185,186. The T-shaped sealer units respectively include tubular legs 190L,191L,192L extending vertically downward from their respective connections to the flexible tubes 188 to horizontal air outlet sections 190H,191H,192H. The outlet sections are closely spaced, axially aligned, cylindrical tubes which collectively define a pair of elongate heater mechanisms disposed on opposite sides of an imaginary vertical plane through the loaded bag path of travel.

Each horizontal outlet section includes an elongate slot for directing air flow originating with the blower 182 onto upstanding bag lips being sealed. Each of the sealer unit legs 191,192 houses an associated heater element of a type normally used in a toaster. Thus air flowing through the T-shaped units 191,192 is heated and the escaping hot air effects seals of the upstanding bag lips. Air flowing through the units 190 is not heated, but rather provides cooling air to accelerate solidification of the seals being formed.

The T-shaped sealer units 190,191,192 are respectively connected to the rod 144 for raising and lowering upon actuation of the air cylinder 145 in the same manner and for the same purpose as described in connection with the embodiment of FIGS. 12 and 13.

A further unique feature of the embodiment of FIGS. 22 and 23 is a vertical adjustment mechanism indicated generally at 194. The vertical adjustment 194 permits adjustment of the slope of the horizontal sections of the T-shaped units 190–192 such that the outlet from 191H is lower than that of 192H. This downward sloping of the heater mechanism in the direction of bag travel assures optimized location of the hot air being blown on the plastic. The location is optimized because as the plastic melts it sags lowering the optimum location for the direction of the hot air. Further the cooling air from the unit 190 is directed onto a now formed bead.

VIII. Operation

The carriages 20, 21 are independently wheeled to a desired location. The two are then physically interconnected by inserting the lock bars 150 into the apertures 151,152.

Assuming the bagger and sealer are in a vertical orientation, the relative heights of the bagger and closure section conveyors are adjusted as is the height of the knife 120. If the angular orientation of the machines is to be adjusted, the bolt(s) 178 is(are) removed and the bagger and sealer section are rotated about the axis of the trunions 157,170, 172 to a desired orientation. Following this rotation the bolt(s) is(are) reinserted to fix the mechanism in its desired angular orientation.

Next a web 15 of bags 25 is fed through the bagger and sealer by jogging the two. The transverse spacing of the main conveyor belts 40, 41 is adjusted by rotating the crank 72 until the load station 60 has the desired transverse dimension. A control, not shown, is set to provide a desired feed rate and a selected one of continuous or intermittent operation. Assuming continuous operation, the feed rate may be as high as 130 ten inch bags per minute, Once the machine is in operation, the top section 21 of the web 15 is fed along the mandrel 24 and slit by the slitter 36. This forms the lips 38, 39 which are folded over the main transport belts 41, 42 by the action of the plow 45. The lip clamp belts 48, 49 descend from the elevated and spring biased pulleys 50S, as shown in FIG. 3. The roller cam 46 cams the clamp belts 48, 49 respectively into the transport belt recesses 51, 52 to provide very positive and firm support for the bags as they are further processed. As successive side connections 30 of the bags are registered with the bag side separator 53, the motor 55 is operated to drive the belt 54 and cause the breaker pins 58 to rupture the side connections 30.

As adjacent runs of the transport belts 41, 42 progress downstream from the bag feed and preparation portion 35, the belts are spread under the action of the belt spreaders 61, 62. As the belts are spread, the lips 38, 39 cause the front and back faces 31, 32 adjacent the lead edge of each bag to separate from the lips 38, 39 by tearing a sufficient length of the perforations between them to allow the lead edge to become the mid point in a bag span between the belts as the bag passes longitudinally through the load station 60. Similarly, the perforations adjacent the trailing edge are torn as the trailing part of the bag is spread until the bag achieves a full rectangular opening as shown in FIG. 4 in particular.

Next a product is inserted into the rectangular bag as indicated schematically in FIGS. 3 and 4. While the schematic showing is of discrete fasteners, it should be recognized that this machine and system are well suited to packaging liquids and bulky products which must be stuffed into a bag, such as pantyhose and rectangular items, such as household sponges.

After the product has been inserted, the adjacent runs of the main transport belts are brought back together and the loaded bag tops are spread longitudinally of the path of travel either by the planetary stretcher 90 or opposed air streams from nozzles 110, 112.

As is best seen in FIG. 3, exit ones 50E of the lip belt pulley set are spaced from the main transport belt and rotatable about angular axes. Expressed more accurately, when the machine is in a vertical loading orientation, the pulleys 50E are above the main transport belt such that the lip transport belts are pulled from the grooves 51, 52.

The now loaded bags pass through the transfer location onto the exit conveyors 115, 116 and thence to the seal station conveyors 118, 119. At this juncture the scrap 124 is severed from the loaded bags by the action of the knife 120. As the bags are advanced through the sealer section, the heater tube 135 is maintained in its lowered and solid line position of FIGS. 12, 13 and 15. If the machine is operated in its intermittent mode, the cylinder 145 is cycled in coordination with the starts and stops of the intermittently operated machine to shift the heater tube 135 between its solid line seal position and its storage position shown in phantom in the FIG. 13.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

We claim:

1. A process of stretching and juxtaposing face and back portions of a bag to facilitate bag closure as the bag and a bag stretcher are relatively moved along a path of travel comprising:
    a) engaging a trailing part of the bag with a first finger projection forming a portion of a first stretcher element;
    b) through an interconnection of the first stretcher element with a second stretcher element bringing a second finger projection forming a portion of the second element into engagement with a lead part of said bag;
    c) thereafter relatively moving the finger projections to spread the bag parts and bring said bag portions into stretched, substantially juxtaposed relationship; and,
    d) moving a third finger projection forming a part of the first stretcher element into another bag as said bag parts are spread.

2. The process of claim 1 wherein the relative movement of the finger projections is caused by moving the bag along said path of travel.

3. The process of claim 1 wherein the finger projections are orbited to effect the relative movement.

4. The process of claim 3 wherein said second finger projection orbits at a faster rate than the first.

5. The process of claim 4 wherein the faster rate of the second projection is one and one half times the rate of the first projection.

6. A mechanism for sequentially tensioning spaced side connections of faces of bags as the bags are sequentially transported along a path of travel, the mechanism comprising:
    a) first and second finger elements;
    b) structure journaling the elements for rotation about a common axis of rotation;
    c) one of the elements including a ring gear;
    d) a planet gear rotatively mounted on the other of the elements and engaging the ring gear such that rotation of the first element causes rotation of the second element at a rotational speed relative to the first element that is at a proportional rate relative to the first element rotation equal to the gear ratio of the ring and planet gears;
    e) each of the elements including a set of outwardly extending fingers; and,
    f) the number of fingers in one set being greater than the number of fingers of the other set.

7. The mechanism of claim 6 wherein said one set includes one and one half times as many fingers as said other set.

8. The mechanism of claim 6 wherein each of the fingers is "L" shaped with a radiused bag engaging end.

9. The mechanism of claim 8 wherein legs of the "L" shaped fingers of one set extend in one circumferential direction and the legs of the "L" shaped fingers of the other set extend in an opposite circumferential direction.

10. The mechanism of claim 6 wherein the elements are journaled on a common shaft.

11. A process for closing each bag of a set of sequentially fed and filled bags comprising:
   a) applying a force to an interior portion of a trailing side of each bag as the bag is fed along a path of travel;
   b) applying an opposing force to an interior portion of a lead side of the bag as the bag continues along the path to stretch the bag and bring bag portions adjacent an opening into substantial juxtaposition;
   c) securing the juxtaposed portions together; wherein:
      i) the force is applied to the trailing side of the bag by engaging the trailing side with a first finger projection forming a portion of a first stretcher element;
      ii) through an interconnection of the first stretcher element with a second stretcher element the interconnection including a pair of ring gears each engaging a planet gear, the second stretcher element having a second finger projection bringing the second finger projection into engagement with the lead side of said bag; and,
      iii) thereafter relatively moving the finger elements to spread the bag sides and bring said bag portions into the juxtaposed position.

12. The process of claim 11, including the step of moving a third finger projection forming a part of the first stretcher element into another bag as said bag sides are spread.

13. The process of claim 11, wherein the relative movement of the finger elements is caused by moving the bag along said path of travel.

14. The process of claim 11, wherein the finger projections are orbited to effect the relative movement.

15. The process of claim 14, wherein said second finger projection orbits at a faster rate than the first.

16. The process of claim 15, wherein the faster rate of the second projection is one and one half times the rate of the first projection.

17. A process of stretching and juxtaposing face and back portions of a bag to facilitate bag closure as the bag and a bag stretcher are relatively moved along a path of travel comprising:
   a) engaging a trailing part of the bag with a first finger projection forming a portion of a first stretcher element;
   b) through an interconnection of the first stretcher element with a second stretcher element including a pair of ring gears each engaging a planet gear, bringing a second finger projection forming a portion of the second element into engagement with a lead part of said bag; and,
   c) thereafter relatively moving the finger projections to spread the bag parts and bring said bag portions into stretched, substantially juxtaposed relationship.

18. The process of claim 17 wherein the relative movement of the finger elements is caused by moving the bag along said path of travel.

19. The process of claim 17 wherein the finger projections are orbited to effect the relative movement and said second finger projection orbits at a faster rate than the first.

20. The process of claim 19 wherein the faster rate of the second projection is one and one half times the rate of the first projection.

* * * * *